No. 870,707. PATENTED NOV. 12, 1907.
G. C. WORTMAN.
BRAKE OPERATING MECHANISM.
APPLICATION FILED OCT. 11, 1906.
3 SHEETS—SHEET 1.
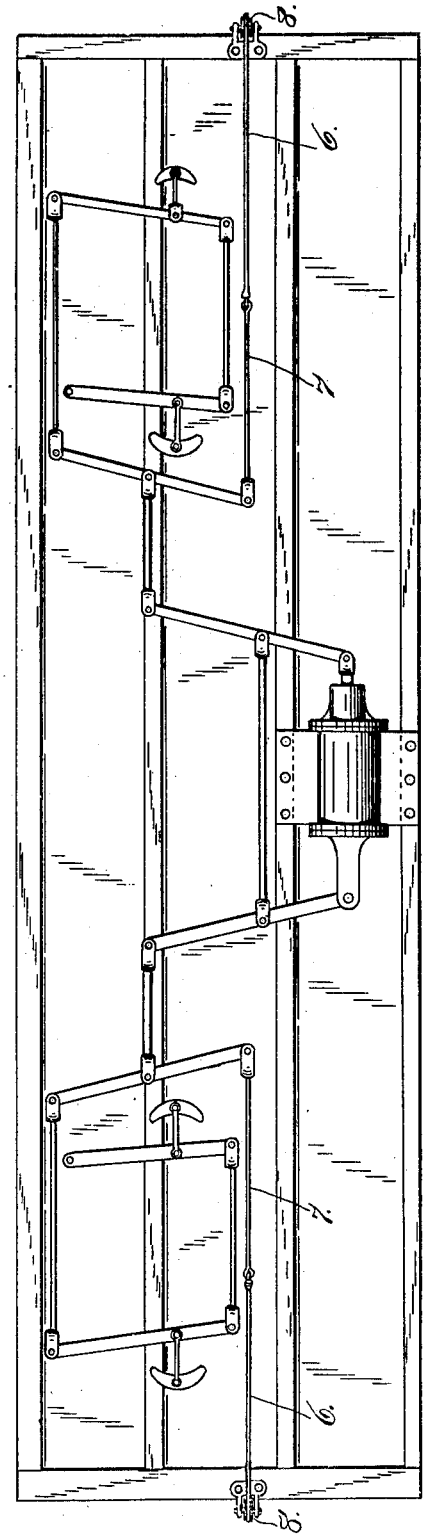

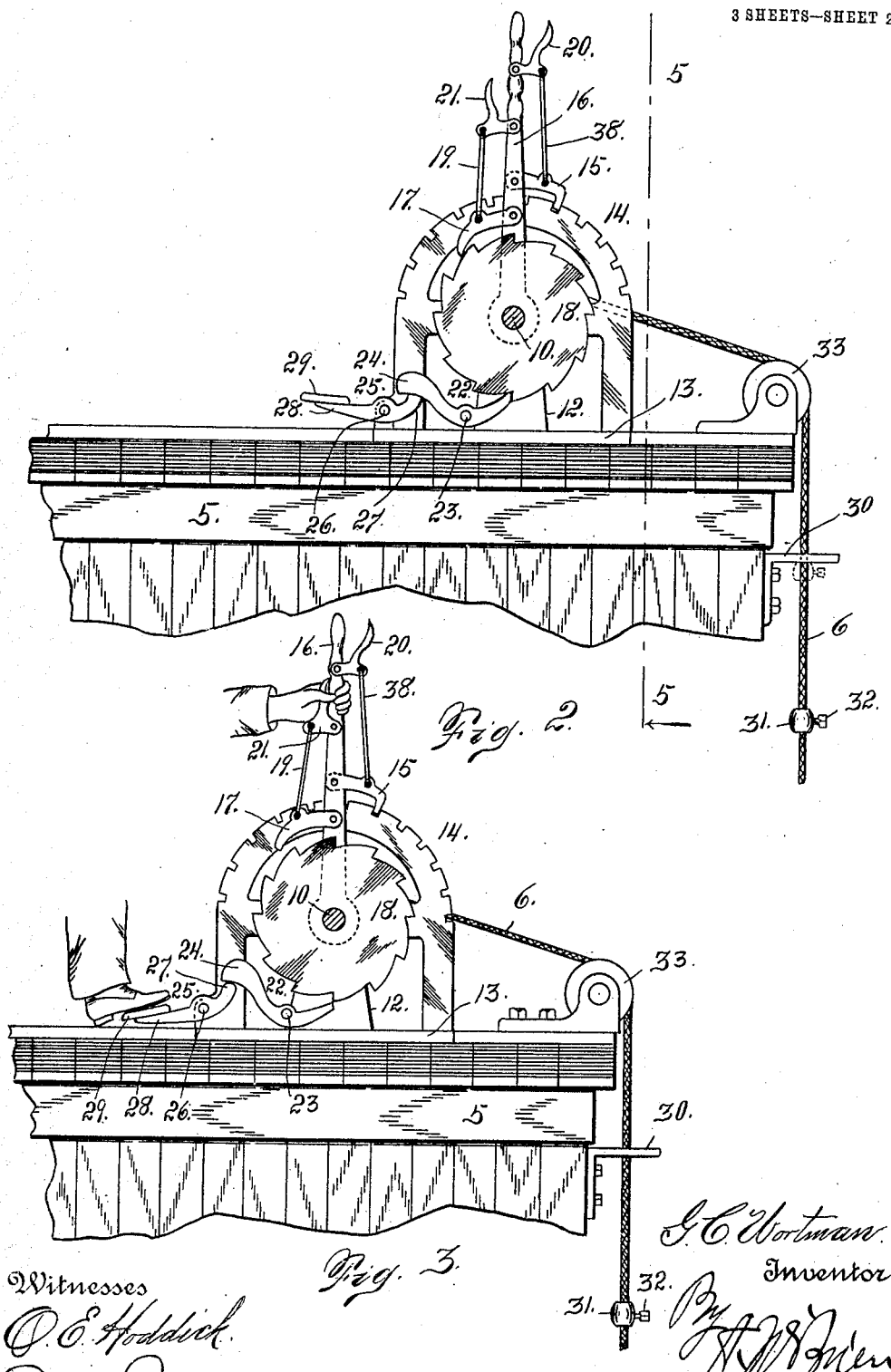

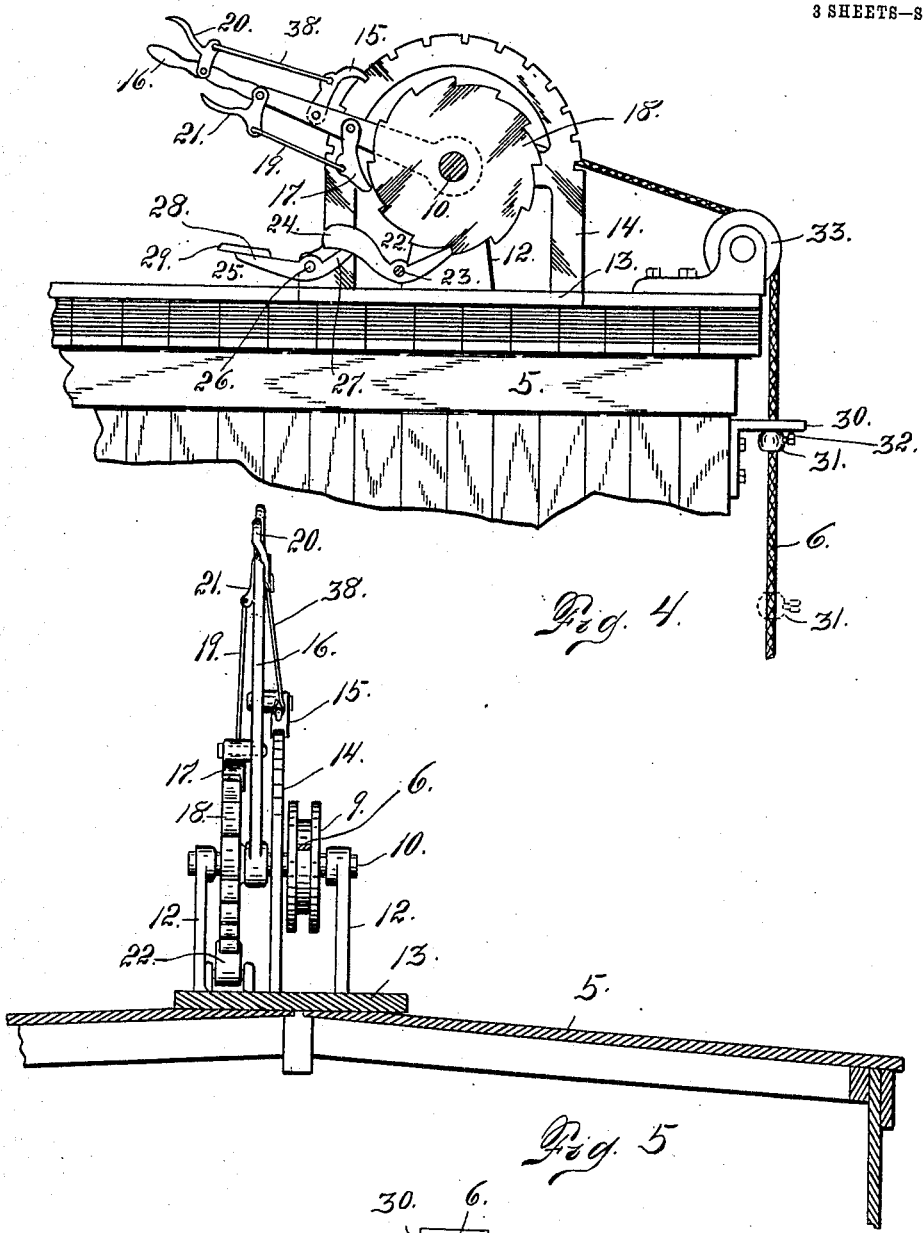

UNITED STATES PATENT OFFICE.

GEORGE C. WORTMAN, OF WORTMAN, COLORADO.

BRAKE-OPERATING MECHANISM.

No. 870,707.  Specification of Letters Patent.  Patented Nov. 12, 1907.

Application filed October 11, 1906. Serial No. 338,401.

*To all whom it may concern:*

Be it known that I, GEORGE C. WORTMAN, a citizen of the United States, residing at Wortman, in the county of Lake and State of Colorado, have invented certain new and useful Improvements in Brake-Operating Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in brake operating mechanism being more especially intended for use in connection with freight cars, and adapted to take the place of the old form of rotatable bar having a hand wheel at the top, the brake chain being wound upon the bar or shaft.

In the old form of construction considerable time is required in order to set the brakes and the proceeding is also more or less dangerous where the brake wheel projects above the top of the car since in turning the wheel, the brakeman is liable to slip and fall between the cars. My improved form of construction is intended to overcome these difficulties by providing an apparatus whereby the brake is set by winding a cable upon a wheel mounted upon a horizontally disposed shaft, requiring only the oscillation of a hand lever, the pull in applying the brake being always in a direction away from the adjacent extremity of the car. By virtue of my improved construction the brakes may be quickly and easily set. Provision is also made in my improved construction, to prevent the setting of the brakes with sufficient force to slide the wheels and flatten their treads. This difficulty is overcome by a simple device consisting of a stop adjustably mounted on the brake operating cable and adapted when the brakes are properly set, to engage an abutment and thus notify the brakeman that the required limit is reached. In connection with the apparatus I employ suitable ratchet and pawl mechanism combined with the usual or ordinary quadrant, all of which will be fully understood by reference to the accompanying drawing in which is illustrated an embodiment thereof.
In this drawing, Figure 1 is an underneath view of a car illustrating an ordinary construction of brake mechanism including the usual levers, rods and brake cylinder. Fig. 2 is a fragmentary side view of a car showing my improved brake operating mechanism applied, and in the position when the brake is set. Fig. 3 is a similar view illustrating the manner of using the device when releasing the brakes. Fig. 4 is a similar view showing the manner of throwing the operating lever downwardly to prevent obstruction in passing through tunnels or under bridges, viaducts or other constructions which might be sufficiently low to cause the lever to strike, if left in its upright position. Fig. 5 is a fragmentary sectional end view of a car with the brake-operating mechanism in place. The sectional part of this view is taken on the line 5—5 Fig. 2. Fig. 6 is a top view of the bracket or abutment attached to the end of the car through which the cable passes.

The same reference characters indicate the same parts in all the views.

Let the numeral 5 designate a car of ordinary construction. As shown in the drawing I prefer to use a flat cable 6 for brake-operating purposes. This cable at either end of the car is connected with a rod 7 connected with the brake mechanism underneath the car. Each cable passes over a pulley 8 suitably mounted at the bottom of the car in order to reduce friction and properly guide the cable. The opposite extremity of the cable is connected with a wheel 9 having double flanges, the space between the flanges being just sufficient to allow the cable to wind easily thereon. By reason of having a flat cable and a wheel of the character stated, there can be no variation in the length of cable required to form a given number of convolutions. Hence it is easy to determine by experiment the degree of movement of the wheel in order to properly apply the brakes, at the same time avoiding setting them sufficiently tight to slide the wheels of the car. This wheel 9 is mounted upon a shaft 10 journaled in uprights 12 attached to the foot-board 13 at the top of the car. Upon the foot-board is also mounted the usual notched quadrant 14 adapted to be engaged by a pawl 15 carried by an operating lever 16. This lever also carries a pawl 17 adapted to engage a ratchet wheel 18 fast on the shaft 10. The operating lever 16 is loose on the shaft. The pawls 15 and 16 are connected with the operating lever in the usual or ordinary manner, that is to say by means of rods 18 and 19 which are connected with the pawls 15 and 17 respectively, at one extremity and with operating devices 20 and 21 at their opposite extremities, the last named devices being fulcrumed on the operating lever.

My improved construction is equipped with a locking pawl 22 fulcrumed at 23 and provided with a weighted arm 24 whereby it has a tendency to occupy the position shown in Fig. 4, that is to say with its holding extremity in engagement with a tooth of the ratchet wheel 18.

In order to disengage the locking pawl from the ratchet wheel, I employ a foot lever 25 fulcrumed at 26, having an arm 27 in engagement with the weighted arm 24 of the locking pawl; and an arm 28 provided with a foot rest 29. When it is desired to release the locking pawl as during the brake setting operation, it is only necessary for the trainman to place his foot upon the foot rest of the lever 25 and press down thereon sufficiently to disengage the locking pawl from the ratchet wheel (see Fig. 3).

The mechanism is so arranged that when the operating lever 16 is locked in place by virtue of the engagement of the pawl 15 with the quadrant 14. The ratchet-engaging extremity of the pawl 17 is about half way between two teeth of the ratchet, while the locking pawl 22 is in engagement with the ratchet tooth. By virtue of this arrangement, the brake operating cable may be released to an extent equal to half the distance between two ratchet teeth, thus permitting a very gradual release of the brake if desired.

The cable 6 as it passes upwardly adjacent the end of the car, passes through an opening formed in a bracket 30 secured to the end of the car. Below this bracket the cable is provided with a stop 31 adjustable thereon by means of a set bolt 32. By properly regulating this stop upon the cable, the stop will engage the bracket and prevent farther upward movement of the cable, when the brakes have been set to the proper degree or so applied, as to properly perform the braking function without sliding the car wheels and flattening their treads. The position of the stop when limiting the travel of the cable through the bracket is indicated by dotted lines in Fig. 2. As the cable passes over the end of the car to the operating mechanism, it engages a pulley or roller 33 which forms both a guide and an antifrictional bearing which prevents any undue wear of the cable.

From the foregoing description the use and operation of my improved mechanism will be readily understood.

Assuming that the parts are in the position shown in Fig. 2, if it is desired to set or apply the brakes, the operator grasps the lever 16 and disengages the pawl 15 from the quadrant. He then moves the operating lever back and forth, that is toward and away from him until the brakes are properly applied. Every time he pulls the lever toward him, the pawl 17 acts on the ratchet wheel to give the shaft 10 a partial rotary movement turning the wheel 9 and winding the cable thereon; while as he moves the lever away from him, the pawl 22 locks the ratchet against the reverse movement.

Attention is called to the fact that the wheel 9 may be located on the shaft 10 in any desired position, that is to say at either extremity or in the center. It is evident that instead of employing a separate ratchet wheel 18, the necessary ratchet teeth may be formed on the wheel 9 and engaged by the pawls 17 and 22.

Having thus described my invention, what I claim is:

1. In brake operating mechanism, the combination with a car, of a winding shaft horizontally mounted a suitable distance above the car, a wheel fast on the shaft, an operating cable connected with the wheel and adapted to wind thereon, a ratchet wheel fast on the shaft, an operating lever loose on the shaft, a pawl connected with the lever and adapted to engage the ratchet wheel for operating the shaft, a quadrant, a suitable connection between the quadrant and the lever, a locking pawl engaging the ratchet, and a foot lever arranged to release the locking pawl, substantially as described.

2. In brake setting mechanism, the combination with a car, of an operating shaft journaled thereon, a cable suitably connected with the shaft, an operating lever, a ratchet and pawl connection between the lever and the shaft, a pawl for locking the shaft against the reverse movement, and suitable means to limit the winding of the cable upon the shaft in order to prevent the setting of the brakes with sufficient force to slide the wheels.

3. The combination with a car, of brake operating mechanism mounted thereon, a cable connected with said mechanism, and suitable means to prevent the setting of the brakes with sufficient force to slide the car wheels, comprising a stop on the cable, and a stationary part adapted to be engaged by the stop for the purpose set forth.

In testimony whereof I affix my signature in presence of two witnesses.

GEORGE C. WORTMAN.

Witnesses:
 DENA NELSON,
 O. E. HODDICK.